United States Patent
Wang et al.

(10) Patent No.: US 9,395,637 B2
(45) Date of Patent: Jul. 19, 2016

(54) NEUTRALIZING AGENTS FOR RESIN EMULSIONS

(71) Applicant: XEROX CORPORATION, Norwalk, CT (US)

(72) Inventors: Yulin Wang, Oakville (CA); Shigang Steven Qiu, Toronto (CA); Ke Zhou, Oakville (CA); Karen A. Moffat, Brantford (CA); Edward G. Zwartz, Mississauga (CA); Michael S. Hawkins, Cambridge (CA); Paul J. Gerroir, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/002,246

(22) Filed: Jan. 20, 2016

(65) Prior Publication Data
US 2016/0147165 A1    May 26, 2016

Related U.S. Application Data

(62) Division of application No. 13/917,475, filed on Jun. 13, 2013, now Pat. No. 9,274,444.

(51) Int. Cl.
*G03G 9/087*    (2006.01)
*G03G 9/08*    (2006.01)

(52) U.S. Cl.
CPC .......... *G03G 9/0804* (2013.01); *G03G 9/08755* (2013.01); *G03G 9/08795* (2013.01)

(58) Field of Classification Search
USPC .................................................. 430/137.14
See application file for complete search history.

(56) References Cited

U.S. PATENT DOCUMENTS

| | | | |
|---|---|---|---|
| 6,653,435 B1 | 11/2003 | Aoki et al. | |
| 8,192,913 B2 | 6/2012 | Faucher et al. | |
| 2007/0212628 A1* | 9/2007 | Ishikawa | G03G 9/0804 430/105 |
| 2008/0153027 A1 | 6/2008 | Veregin et al. | |
| 2011/0305984 A1* | 12/2011 | Tominaga | G03G 9/09314 430/108.4 |
| 2013/0011774 A1* | 1/2013 | Kamiwaki | G03G 9/0821 430/105 |

* cited by examiner

*Primary Examiner* — Peter Vajda
(74) *Attorney, Agent, or Firm* — Pillsbury Winthrop Shaw Pittman LLP

(57) ABSTRACT

Incorporation of organic amines as neutralization agents in based phase inversion emulsification (PIE) processes to provide emulsification of high molecular amorphous and high molecular branch amorphous polyester resins, which are traditionally difficult to emulsify. The organic amines facilitate emulsification of these resins to achieve desired particle size with a narrow size distribution.

12 Claims, 5 Drawing Sheets

NEUTRALIZING AGENTS FOR RESIN EMULSIONS

CROSS REFERENCE TO RELATED APPLICATION

This application is a division of, and claims the benefit of priority to, U.S. patent application Ser. No. 13/917,475, filed Jun. 13, 2013, the entire contents of which is incorporated herein by reference.

BACKGROUND

The present embodiments provide toners, and in particular, emulsion aggregation (EA) toners. These toners exhibit a low melt temperature while simultaneously exhibiting excellent relative humidity sensitivity regarding charging properties. Also described are methods of making such toners.

Advantages of the toners described herein include, for example, the ability to incorporate crystalline materials into the toner to achieve low melting characteristics without sacrificing relative humidity sensitivity.

Low melting, including ultra low melting, toners are known. For example, such toners may be comprised of an amorphous polyester material having a crystalline polyester material mixed therein. The crystalline polyester material imparts the low melting temperature to the polyester toner. An example of such a low melting polyester toner is described in, for example, U.S. Pat. No. 6,830,860 and U.S. Pat. Publication No. 2008/0153027, the disclosures of which are incorporated herein by reference in their entirety.

Polyester toners have been prepared utilizing amorphous and crystalline polyester resins. The incorporation of these polyester resins into toner requires that the resins first be formulated into emulsions prepared by solvent containing batch processes, for example solvent-based phase inversion emulsification (PIE) is known in the art. Ammonium hydroxide ($NH_4OH$) is known in the art as a "basic neutralization agent" in the polyester emulsification process. See, e.g., U.S. Pat. No. 8,192,913. The ammonium hydroxide inverts the resin dissolved oil phase (resin/solvent solution) in water to form a stable aqueous emulsion.

In the PIE process, the type of base or neutralizing agent and ratio of neutralizing agent to resin or solvent plays a very critical role. There are many input process parameters such as resin composition, resin molecular weight and acid value that can vary which make it impossible to emulsify high molecular weight branched amorphous polyester resins to produce the desired particle size range (e.g., 100-250 nm) and a narrow particle size distribution. Lot-to-lot variations of resin acid value, viscosity, and resin softening point requires adjustments in the PIE process parameters such as neutralization ratio and solvent ratio to achieve the desired toner particle size. Determining such adjustments is time-consuming and requires much trial and error to identify the exact conditions that will allow a resin lot to be successfully emulsified. Moreover, even with these modifications some polyester resins are not successfully emulsified, with failed batches where particle size was greater than 400 nm. In particular, certain high molecular weight branched amorphous polyester resins with lower acid values are not emulsified when ammonia hydroxide is used as the neutralization agent.

Therefore, there is a need to identify a new neutralization agent for the preparation of polyester latexes suitable for polymers possessing a variation in parameters such as lower acid value, higher softening point and the like.

SUMMARY

According to embodiments illustrated herein, there is provided a process comprising mixing at least one polyester resin with a solvent to form a resin mixture; neutralizing the resin mixture with a neutralizing agent in water; and agitating the resin mixture and neutralizing agent in water to form an aqueous emulsion, wherein the neutralizing agent is an organic amine.

In particular, the present embodiments provide a process comprising mixing at least one polyester resin with a solvent to form a resin mixture, wherein the polyester resin is a high molecular weight polyester amorphous resin or a high molecular weight branched polyester amorphous resin; neutralizing the resin mixture with a neutralizing agent in water; and agitating the resin mixture and neutralizing agent in water to form an aqueous emulsion, wherein the neutralizing agent is an organic amine selected from the group consisting of triethylamine, triethaneolamine, and mixtures thereof.

In embodiments, there is also provided an emulsion aggregate toner comprising at least one polyester resin in a solvent; a neutralizing agent being an organic amine; and one or more toner additives.

BRIEF DESCRIPTION OF THE DRAWINGS

For a better understanding of the present embodiments, reference may be made to the accompanying figures.

DETAILED DESCRIPTION

Figure 1:
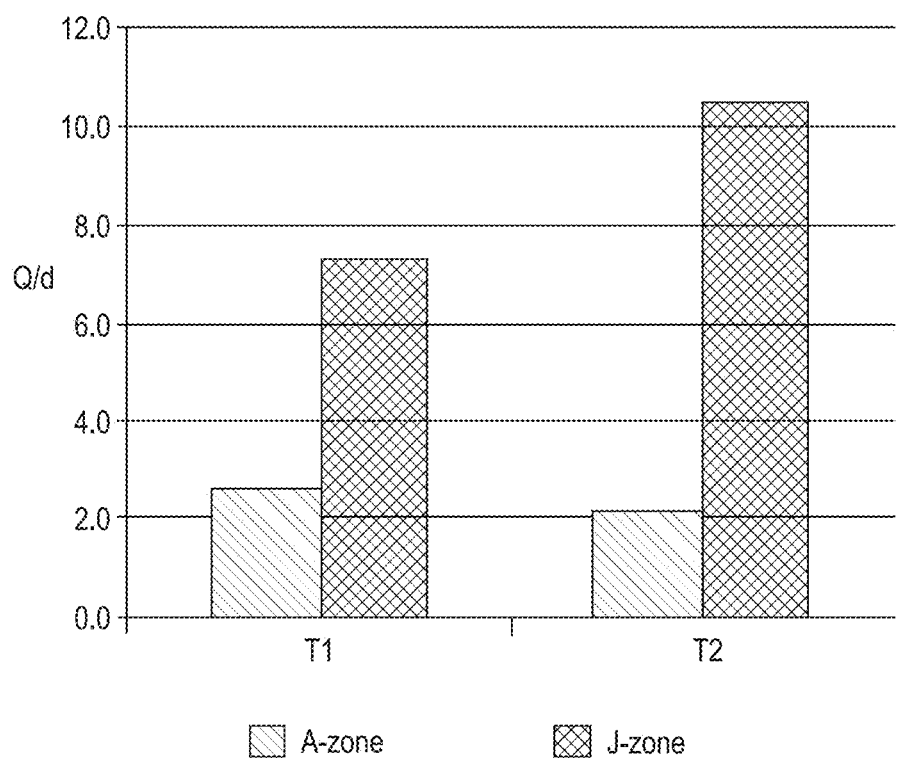
FIG. 1 is a graph illustrating a comparison of toner performance in A zone and J zone of toners produced by the present embodiments as compared to those produced by a control.

In the following description, it is understood that other embodiments may be utilized and structural and operational changes may be made without departure from the scope of the present embodiments disclosed herein.

One known method of forming emulsified polyester resin latex for use in polyester emulsion aggregation toners is a solvent-based phase inversion emulsification (PIE) process. In this process, generally, ammonium hydroxide is used as the neutralization agent to invert the resin dissolved oil phase (resin/solvent solution) in water to form a stable aqueous emulsion. The present embodiments provide an organic amine, such as triethylamine or triethaneolamine or other organic amines, as the neutralization agent. These neutralization agents may provide, in certain embodiments, easier emulsification of particular high molecular amorphous and high molecular weight branched amorphous polyester resins which possess very low acid value, high softening point or viscosity to achieve the desired toner particle size with narrow particle size distribution as a scalable emulsification process with a wide operating window. These resulting polyester resin emulsions can be used in low melt or ultra low melt emulsion aggregation toners. In embodiments, the process of the present disclosure does not employ a basic neutralization agent, such as, ammonium hydroxide.

In the present embodiments, the neutralization agent is an organic amine, such as, triethylamine, triethaneolamine, and mixtures thereof.

The organic amine neutralization agent can be used to emulsify a polyester resin to produce emulsions with particle size in the desired range of from about 100 nm to about 250 nm (in volume average diameter) with a narrow particle size distribution as measured by the Coulter Counter method. In further embodiments, the resulting emulsions have a particle size in the desired range of from about 120 nm to about 220 nm, or from about 150 nm to about 200 nm with a narrow particle size distribution. The resulting polyester resin emulsions are useful in producing low melt or ultra low melt emulsion aggregate toners.

The polyester resin that may be emulsified by the organic amine neutralization agent of the present disclosure includes any amorphous polyester resin and/or crystalline polyester resin, especially those with a low acid value of from about 3 mg KOH/g of resin to about 200 mg KOH/g of resin, from about 5 mg KOH/g of resin to about 50 mg KOH/g of resin, or from about 7 mg KOH/g of resin to about 15 mg KOH/g of resin. These polymer resins typically include acid terminated end groups.

The acid number may be detected by titration with KOH/methanol solution containing phenolphthalein or bromothymol blue as the indicator. The acid number may then be calculated based on the equivalent amount of KOH/methanol required to neutralize all the acid groups on the resin identified as the end point of the titration. In embodiments, the polyester resin may include branched or straight chained amorphous polyester. In embodiments, the polyester resin includes a high molecular weight polyester amorphous resin or a high molecular weight branched polyester amorphous resin.

Specific examples of amorphous polyester materials that may be used include both branched and linear amorphous materials, and combinations of branched and linear amorphous materials. The amorphous polyester materials may be formed by the polycondensation of an organic alcohol such as a diol or glycol and an acid, including anhydrides, optionally with a multivalent polyacid or polyol as a branching agent, and a polycondensation catalyst. The amorphous polyesters may further be crosslinked, that is, may include crosslinked portions therein. Suitable acids may include, for example, succinic acid, glutaric acid, adipic acid, pimelic acid, suberic acid, azelaic acid, sebacic acid, isophthalic acid, terephthalic acid, hexachloroendo methylene tetrahydrophthalic acid, maleic acid, fumaric acid, chloromaleic acid, methacrylic acid, acrylic acid, itaconic acid, citraconic acid, mesaconic acid, maleic anhydride, phthalic anhydride, chlorendic anhydride, tetrahydrophthalic anhydride, hexahydrophthalic anhydride, endomethylene tetrahydrophthalic anhydride, tetrachlorophthalic anhydride, tetrabromophthalic anhydride, and the like and mixtures thereof. Suitable alcohols may include, for example, propylene glycol, ethylene glycol, diethylene glycol, neopentyl glycol, dipropylene glycol, dibromoneopentyl glycol, propoxylated bisphenol A, ethoxylated bisphenol A and other alkoxylated bisphenol A diols, 2,2,4-trimethylpentane-1,3-diol, tetrabromo bisphenol dipropoxy ether, 1,4-butanediol, and the like and mixtures thereof. Desirable amorphous polyester materials may be prepared from diacids and/or anhydrides such as, for example, maleic anhydride, fumaric acid, and the like and mixtures thereof, and diols such as, for example, propoxylated bisphenol A, propylene glycol, and the like and mixtures thereof. A poly (propoxylated bisphenol A fumarate) polyester is suitable.

The amorphous polyester may also be comprised of an alkali sulfonated polyester resin, such as the metal or alkali salts of copoly(ethylene-terephthalate)-copoly(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfoisophthalate), copoly(propylene-butylene-terephthalate)-copoly(propylene-butylene-5-sulfo-isophthalate), copoly(propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), and copoly(ethoxylated bisphenol-A-maleate)-copoly(ethoxylated bisphenol-A-5-sulfo-isophthalate), wherein the alkali metal is, for example, a sodium, lithium or potassium ion.

The amorphous polyester may include crosslinked portions therein, for example such that the toner has a weight fraction of the microgel (a gel content) in the range of, for example, from about 0.001 to about 50 weight percent, such as from about 0.1 to about 40 weight percent or from about 1 to about 10 weight percent, of the amorphous polyester. The gel content may be achieved either by mixing in an amount of crosslinked material, or crosslinking portions of the amorphous polyester, for example by including a crosslinking initiator in the amorphous polyester. The initiators may be, for example, peroxides such as organic peroxides or azo-compounds, for example diacyl peroxides such as decanoyl peroxide, lauroyl peroxide and benzoyl peroxide, ketone peroxides such as cyclohexanone peroxide and methyl ethyl ketone, alkyl peroxy esters such as t-butyl peroxy neodecanoate, 2,5-dimethyl 2,5-di(2-ethyl hexanoyl peroxy)hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, oo-t-butyl o-isopropyl mono peroxy carbonate, 2,5-dimethyl 2,5-di (benzoyl peroxy)hexane, oo-t-butyl o-(2-ethyl hexyl) mono peroxy carbonate, and oo-t-amyl o-(2-ethyl hexyl) mono peroxy carbonate, alkyl peroxides such as dicumyl peroxide, 2,5-dimethyl 2,5-di(t-butyl peroxy)hexane, t-butyl cumyl peroxide, bis(t-butyl peroxy)diisopropyl benzene, di-t-butyl peroxide and 2,5-dimethyl 2,5-di(t-butyl peroxy)hexyne-3, alkyl hydroperoxides such as 2,5-dihydro peroxy 2,5-dimethyl hexane, cumene hydroperoxide, t-butyl hydroperoxide and t-amyl hydroperoxide, and alkyl peroxyketals such as n-butyl 4,4-di(t-butyl peroxy)valerate, 1,1-di(t-butyl peroxy) 3,3,5-trimethyl cyclohexane, 1,1-di(t-butyl peroxy)cyclohexane, 1,1-di(t-amyl peroxy)cyclohexane, 2,2-di(t-butyl peroxy)butane, ethyl 3,3-di(t-butyl peroxy)butyrate and ethyl 3,3-di(t-amyl peroxy)butyrate, azobis-isobutyronitrile, 2,2'-azobis(isobutyronitrile), 2,2'-azobis (2,4-dimethyl valeronitrile), 2,2'-azobis(methyl butyronitrile), 1,1'-azobis(cyano cyclohexane), 1,1-di(t-butyl peroxy)-3,3,5-trimethylcyclohexane, combinations thereof and the like. The amount of initiator used is proportional to the degree of crosslinking, and thus the gel content of the polyester material. The amount of initiator used may range from, for example, about 0.01 to about 10 weight percent, such as from about 0.1 to about 5 weight percent or the amorphous polyester. In the crosslinking, it is desirable that substantially all of the initiator be used up. The crosslinking may be carried out at high temperature, and thus the reaction may be very fast, for example, less than 10 minutes, such as from about 20 seconds to about 2 minutes residence time.

Branching agents to generate a branched amorphous polyester may include, for example, a multivalent polyacid such as 1,2,4-benzenetricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra(methylene-carboxyl)methane, and 1,2,7,8-octanetetracarboxylic acid, acid anhydrides thereof, and lower alkyl esters thereof having from about 1 to about 6 carbon atoms; a multivalent polyol such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof, and the like. The branching agent amount selected is, for example, from about 0.01 to about 10 mole percent of the polyester material, such as from about 0.05 to about 8 mole percent or from about 0.1 to about 5 mole percent of the polyester material.

The amorphous polymer may comprise, for example, from about 50 to about 95 percent by weight, such as from about 75 to about 95 percent by weight or from about 80 to about 90 percent by weight, of the binder. In embodiments, the amorphous polymer material, such as the amorphous polyester material, possesses, for example, a number average molecular weight (Mn), as measured by gel permeation chromatography (GPC), of from about 1,000 to about 500,000, such as from about 2,000 to about 250,000; a weight average molecular weight (Mw) of, for example, from about 1,000 to about 600,000, such as from about 2,000 to about 300,000, as determined by GPC using polystyrene standards; and a molecular weight distribution (Mw/Mn) of, for example, from about 1.5 to about 6, such as from about 2 to about 4.

In the present embodiments, the solvent-based phase inversion emulsification process generally involves the following steps: contacting a polyester resin with an organic solvent to form a resin mixture; neutralizing the resin mixture with a neutralizing agent (i.e., organic amine) in the presence of water; agitating the resin mixture with the neutralizing agent to form an aqueous emulsion. In embodiments, the process further includes adding water dropwise after the addition of organic amine to the aqueous emulsion until phase inversion occurs to form a phase inversed mixture. The aqueous emulsion may be used to form an emulsion aggregate toner.

Any suitable organic solvent may be used to dissolve the polyester resin to form a resin mixture. Suitable organic solvents include, for example, alcohols, esters, ethers, ketones, amines, and combinations thereof. Specific examples of organic solvents include, for example, methanol, ethanol, propanol, isopropanol (IPA), butanol, ethyl acetate, methyl ethyl ketone, and the like, and combinations thereof. The organic solvent may be present in an amount of, for example, from about 30% by weight to about 400% by weight of the resin, in embodiments, from about 40% by weight to about 250% by weight of the resin, in embodiments, from about 50% by weight to about 100% by weight of the resin. In embodiments, a solvent mixture can be used, which includes a mixture of two or more solvents. The ratio of any two organic solvents in a solvent mixture may be from about 5:1 to about 50:1, from about 7:1 to about 30:1, or from about 9:1 to about 25:1, or from about 3:1 to about 20:1. In embodiments, a solvent mixture comprises ketone and alcohol.

In embodiments, the organic solvent may be immiscible in water and may have a boiling point of from about 30° C. to about 120° C.

In embodiments, the resin dissolved oil phase comprises a weight ratio of the resin to solvent of about 2:1 to about 1:5 or of about 3:2 to about 1:4 or of about 1:1 to about 1:2.

The resin mixture can be neutralized with the neutralizing agent of the present embodiments. An aqueous emulsion can be formed upon agitation of the resin mixture and the neutralizing agent in water. The aqueous emulsion can then be used to form an emulsion aggregate toner.

The neutralizing agent may be present in the aqueous emulsion in an amount of from about 0.001% by weight to 50% by weight of the resin, in embodiments from about 0.01% by weight to about 25% by weight of the resin, in embodiments from about 0.1% by weight to 5% by weight of the resin. In embodiments, the neutralizing agent may be added in the form of an aqueous solution. In other embodiments, the neutralizing agent may be added in the form of a solid.

Utilizing the neutralization agent in combination with a resin possessing acid groups, a neutralization ratio of from about 50% to about 300% may be achieved, in embodiments from about 70% to about 200%. In embodiments, the neutralization ratio may be calculated as the molar ratio of basic groups provided with the basic neutralizing agent to the acid groups present in the resin multiplied by 100%.

A low melt or ultra low melt toner typically has a glass transition temperature of from, for example, about 45° C. to about 85° C., such as from about 50° C. to about 65° C. or from about 50° C. to about 60° C. Such toners also exhibit a desirably low fixing or fusing temperature, for example a minimum fusing temperature of from about 75° C. to about 150° C., such as from about 80° C. to about 150° C. or from about 90° C. to about 130° C. Such low melt characteristics are desirable in enabling the toner to be fixed or fused onto an image receiving substrate such as paper at a lower temperature, which can result in energy savings as well as increased device speed.

In addition, the toner may have a relative humidity sensitivity of, for example, from about 0.5 to about 10, such as from about 0.5 to about 5. Relative humidity (RH) sensitivity is a ratio of the charging of the toner at high humidity conditions to charging at low humidity conditions. That is, the RH sensitivity is defined as the ratio of toner charge in J-zone to toner charge in A-zone); thus, RH sensitivity is determined as (J-zone charge)/(A-zone charge). Ideally, the RH sensitivity of a toner is as close to 1 as possible, indicating that the toner charging performance is the same in low and high humidity conditions, that is, that the toner charging performance is unaffected by the relative humidity.

A toner having the above low melt/ultra low melt characteristics and RH sensitivity characteristics may be comprised of a binder comprising both an amorphous polymer material, such as a resin or polymer, and a crystalline polymer material, such as a resin or binder.

The toner may desirably be a polyester toner, comprised of both an amorphous polyester material, such as a resin or polymer, and a crystalline polyester material, such as a resin or binder.

The binder also includes a crystalline polymer material. As used herein, "crystalline" refers to, for example, a material with a three dimensional order, and encompasses both crystalline and semicrystalline materials. "Semicrystalline" refers to materials with a crystalline percentage of less than 100%, for example, from about 10 to about 60%. The polymer is considered crystalline when it is comprised of crystals with a regular arrangement of its atoms in a space lattice, and thus provides a defined melting point. An amorphous polymer, on the other hand, lacks such an organized crystalline structure and lacks a defined melting point.

The crystalline polymer material may be of the same kind as or different kind from the polymer of the amorphous polyester material. For example, both polymer materials may be of the same kind by both being polyester materials.

Any crystalline polymer material may be used, for example including polyesters, polyester-polyimides, polyimides, polyamides and the like. In certain embodiments, a crystalline polyester material is used.

Acid groups which may be present include carboxylic acid groups, and the like. The crystalline polymer may have an acid number of from about from about 3 mg KOH/g of resin to about 200 mg KOH/g of resin, in embodiments, from about 5 mg KOH/g of resin to about 50 mg KOH/g of resin, or from about 7 mg KOH/g of resin to about 15 mg KOH/g of resin.

A crystalline polyester may be prepared by polycondensation of an organic alcohol such as diol or glycol and an organic diacid in the presence of a polycondensation catalyst. Additionally, in place of an organic diacid, an organic diester may also be selected, and where an alcohol byproduct is generated.

For example, the crystalline polyester may be obtained by polycondensing an alcohol component comprising 80% by mole or more of an aliphatic diol having 2 to 6 carbon atoms, such as 4 to 6 carbon atoms, with a carboxylic acid component comprising 80% by mole or more of an aliphatic dicarboxylic acid compound having 2 to 8 carbon atoms, such as 4 to 6 carbon atoms or 4 carbon atoms. See, for example, U.S. Pat. No. 6,780,557. The aliphatic diol having 2 to 6 carbon atoms may include ethylene glycol, 1,2-propylene glycol, 1,3-propylene glycol, 1,4-butanediol, 1,5-pentanediol, 1,6-hexanediol, neopentyl glycol, 1,4-butanediol, and the like. It is desirable that the aliphatic diol is contained in the alcohol component in an amount of about 80% by mole or more, such as from about 85 to 100% by mole. The alcohol component may also contain a polyhydric alcohol component other than the aliphatic diol having 2 to 6 carbon atoms. Such a polyhydric alcohol component includes a divalent aromatic alcohol such as an alkylene (2 to 3 carbon atoms) oxide adduct (average number of moles added being 1 to 10) of bisphenol A, such as polyoxypropylene(2.2)-2,2-bis(4-hydroxyphenyl) propane and polyoxyethylene (2.2)-2,2-bis(4-hydroxyphenyl)propane; a trihydric or higher polyhydric alcohol component such as glycerol, pentaerythritol and trimethylolpropane; and the like. The aliphatic dicarboxylic acid compound having 2 to 8 carbon atoms includes oxalic acid, malonic acid, maleic acid, fumaric acid, citraconic acid, itaconic acid, glutaconic acid, succinic acid, adipic acid, acid anhydrides thereof, alkyl (1 to 3 carbon atoms) esters thereof, and the like. It is desirable that the aliphatic dicarboxylic acid compound is contained in the carboxylic acid component in an amount of about 80% by mole or more, such as from about 85 to 100% by mole. Among them, from the viewpoint of the storage ability of the crystalline polyester, it is desirable that fumaric acid is contained in the carboxylic acid component in an amount of about 60% by mole or more, such as about 70 to 100% by mole. The carboxylic acid component may contain a polycarboxylic acid component other than the aliphatic dicarboxylic acid compound having 2 to 8 carbon atoms. Such a polcarboxylic acid component includes aromatic dicarboxylic acids such as phthalic acid, isophthalic acid and terephthalic acid; aliphatic dicarboxylic acids such as sebacic acid, azelaic acid, n-dodecylsuccinic acid and n-dodecenylsuccinic acid; alicyclic carboxylic acids such as cyclohexanedicarboxylic acid; tricarboxylic or higher polycarboxylic acids such as 1,2,4-benzenetricarboxylic acid (trimellitic acid) and pyromellitic acid; acid anhydrides thereof, alkyl (1 to 3 carbon atoms) esters thereof, and the like.

The crystalline polyester may also be derived from monomers containing an alcohol component such as a diol and/or comprising a trihydric or higher polyhydric alcohol, and an organic acid and/or a carboxylic acid component comprising a tricarboxylic or higher polycarboxylic acid compound as detailed in U.S. Pat. No. 6,653,435, incorporated herein by reference in its entirety. The trihydric or higher polyhydric alcohols include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, 1,3,5-trihydroxymethylbenzene, and the like. Examples of the tricarboxylic or higher polycarboxylic acid compound include 1,2,4-benzenetricarboxylic acid (trimellitic acid), 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxy-2-methyl-2-methylenecarboxypropane, 1,2,4-cyclohexanetricarboxylic acid, tetra(methylenecarboxyl)methane, 1,2,7,8-octanetetracarboxylic acid, pyromellitic acid, Empol trimer acid, acid anhydrides thereof, alkyl (1 to 3 carbon atoms) esters thereof, and the like.

The aforementioned crystalline polyester materials may be prepared by the polycondensation reactions described in the aforementioned patents.

In embodiments, the crystalline polyester material may be derived from a monomer system comprised of an alcohol selected from among 1,4-butanediol, 1,6-hexanediol, and mixtures thereof with a dicarboxylic acid selected from among fumaric acid, succinic acid, oxalic acid, adipic acid, and mixtures thereof. For example, the crystalline polyester may be derived from 1,4-butanediol and/or 1,6-hexanediol and fumaric acid, the polyester having a crystallinity of about 25 to about 75% such as from about 40 to about 60%.

Examples of organic diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanedioi, 1,8-octanediol, 1,9-nonanediol, 1,10-decanediol, 1,12-dodecanediol and the like; alkali sulfoaliphatic diols such as sodio 2-sulfo-1,2-ethanediol, lithio 2-sulfo-1,2-ethanediol, potassio 2-sulfo-1,2-ethanediol, sodio 2-sulfo-1,3-propanediol, lithio 2-sulfo-1,3-propanediol, potassio 2-sulfo-1,3-propanediol, mixture thereof, and the like.

Examples of organic diacids or diesters selected for the preparation of the crystalline resins include oxalic acid, succinic acid, glutaric acid, adipic acid, suberic acid, azelaic acid, sebacic acid, phthalic acid, isophthaiic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof.

Generally, a stoichiometric equimolar ratio of organic diol and organic diacid is utilized. However, in some instances, wherein the boiling point of the organic diol is from about 180° C. to about 230° C., an excess amount of diol may be utilized and removed during the polycondensation process.

Polycondensation catalyst examples for either the crystalline or amorphous polyesters include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof; and which catalysts are selected in amounts of, for example, from about 0.01 mole percent to about 5 mole percent based on the starting diacid or diester used to generate the polyester resin.

Additional examples of crystalline polymer materials include other polyesters, polyam ides, polyim ides, polyolefins, polyethylene, polybutylene, polyisobutyrate, ethylene-propylene copolymers, ethylene-vinyl acetate copolymers, polypropylene, mixtures thereof, and the like. Specific examples include poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), alkali copoly(5-sulfoisophthaloyl)-copoly(ethylene-adipate), alkali copoly(5-sulfoisophthaloyl)-copoly(propylene-adipate), alkali copoly(5-sulfoisophthaloyl)-copoly(butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfo-isophthaloyl)-copoly(ethylene-adipate), alkali copoly(5-sulfo-isophthaloyl)-copoly (propylene-adipate), alkali copoly(5-sulfo-isophthaloyl)-copoly (butylene-adipate), alkali copoly(5-sulfo-isophthaloyl)-copoly(pentylene-adipate), alkali copoly(5-sulfo-isophthaloyl)-copoly(hexylene-adipate), alkali copoly(5-sulfo-isophthaloyl)-copoly(octylene-adipate), alkali copoly(5-sulfoisophthaloyl)-copoly(ethylene-succinate), alkali copoly(5-sulfoisophthaloyl)-copoly(propylene-succinate), alkali copoly(5-sulfoisophthaloyl)-copoly(butylenes-succinate), alkali copoly(5-sulfoisophthaloyl)-copoly(pentylene-succinate), alkali copoly(5-sulfoisophthaloyl)-copoly(hexylene-succinate), alkali copoly(5-sulfoisophthaloyl)-copoly(octylene-succinate), alkali copoly(5-sulfo-isophthaloyl)-copoly(ethylene-sebacate), alkali copoly(5-sulfo-isophthaloyl)-copoly(propylene-sebacate), alkali copoly(5-sulfo-isophthaloyl)-copoly(butylene-sebacate), alkali copoly(5-sulfo-isophthaloyl)-copoly(pentylene-sebacate), alkali copoly(5-sulfo-isophthaloyl)-copoly(hexylene-sebacate), alkali copoly(5-sulfo-isophthaloyl)-copoly(octylene-sebacate), alkali copoly(5-sulfo-isophthaloyl)-copoly(ethylene-adipate), alkali copoly(5-sulfo-isophthaloyl)-copoly(propylene-adipate), alkali copoly(5-sulfo-isophthaloyl)-copoly (butylene-adipate), alkali copoly(5-sulfo-isophthaloyl)-copoly(pentylene-adipate), alkali copoly(5-sulfo-isophthaloyl)-copoly(hexylene-adipate), poly(octylene-adipate), and wherein alkali is a metal like sodium, lithium or potassium. Examples of polyam ides include poly(ethylene-adipamide), poly(propylene-adipamide), poly(butylenes-adipamide), poly(pentylene-adipamide), poly(hexylene-adipamide), poly(octylene-adipamide), poly(ethylene-succinamide), and poly(propylene-sebecamide). Examples of polyim ides include poly(ethylene-adipimide), poly(propylene-adipimide), poly(butylene-adipimide), poly(pentylene-adipimide), poly(hexylene-adipimide), poly(octylene-adipimide), poly(ethylene-succinimide), poly(propylene-succinimide), and poly(butylene-succinimide), The crystalline material in the toner may have a melting temperature of, for example, from about 30° C. to about 12° C., such as from about 50° C. to about 90° C., and a recrystallization temperature of at least about 40° C., such as a recrystallization temperature of, for example, from about 50° C. to about 65° C. In embodiments, the crystalline resin is a sulfonated polyester resin. The crystalline resin may be sulfonated from about 0.5 weight percent to about 4.5 weight percent, such as from about 1.5 weight percent to about 4.0 weight percent, of the crystalline polyester. The crystalline material may possess, for example, a number average molecular weight (Mn), as measured by gel permeation chromatography (GPC) of, for example, from about 1,000 to about 250,000, and preferably from about 2,000 to about 50,000 and a weight average molecular weight (Mw) of, for example, from about 1,000 to about 250,000, such as from about 2,000 to about 100,000, as determined by GPC using polystyrene standards. The molecular weight distribution (Mw/Mn) of the crystalline material may be, for example, from about 2 to about 6, and more specifically, from about 2 to about 4.

The crystalline polymer material is, for example, present in an amount of from about 5 to about 50 percent by weight of the binder, such as from about 5 to about 25 percent by weight or from about 10 to about 25% by weight, of the binder.

In addition to the binder, the toner may also include at least one colorant and/or at least one wax. Colorant includes pigment, dye, mixtures of dyes, mixtures of pigments, mixtures of dyes and pigments, and the like.

When present, the colorant may be added in an effective amount of, for example, from about 1 to about 25 percent by weight of the toner, such as in an amount of from about 2 to about 12 weight percent of the toner. Suitable example colorants include, for example, carbon black like REGAL 330® magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there may be selected cyan, magenta, yellow, red, green, brown, blue or mixtures thereof. Specific examples of pigments include phthalocyanine HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colorants that can be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like, Illustrative examples of cyans include copper tetra(octadecyl sulfonamido)phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. Other known colorants can be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991 K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871 K (BASF), Paliogen Red 3340 (BASF), and Lithol Fast Scarlet L4300 (BASF).

Optionally, a wax may be present in an amount of from about 1 to about 30% by weight of the toner, such as from about 1 to about 15% by weight of the toner. The wax may function as, for example, a release agent to assist in the release of toner images from a fuser roll. Examples of waxes are known, and include, for example, alkylenes, such as polypropylene, polyethylene, and the like. The waxes may be hydrophobic and essentially water insoluble. The wax may include (1) natural waxes such as those extracted from vegetables (carnauba wax, Japan wax, bayberry wax) or animals (beeswax, shellac wax, spermaceti wax); (2) mineral waxes, such as those extracted, for example, from bituminous lignite or share (montan wax, ozokerite wax, ceresin wax); (3) petroleum waxes, complex mixtures of paraffinic hydrocarbons obtained from the distillation of crude petroleum (paraffin wax), or by dewaxing heavy lubricating oils and petrolatum residues (microcrystalline wax); and (4) synthetic waxes generated, for example, by chemical processes including petroleum, Fischer-Tropsch (by coal gasification), polyethylene, polypropylene, acrylate, fatty acid amides, silicone and polytetrafluoroethylene waxes. Specific examples of waxes for use herein include polypropylenes and polyethylenes such as commercially available from Allied Chemical and Petrolite Corporation (for example, the POLYWAX™ line of waxes), wax emulsions available from Michaelman, Inc. and the Daniels Products Company, EPOLENE N-15™ commercially available from Eastman Chemical Products, Inc., VISCOL 550-P™, a low weight average molecular weight polypropylene available from Sanyo Kasei K. K., and similar materials. Additional examples of suitable waxes include natural waxes such as carnauba wax, functionalized waxes such as amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, for example MICROSPERSION 19™ also available from Micro is Powder Inc., imides, esters, quaternary amines, carboxylic acids or acrylic polymer emulsion, for example JONCRYL™, all available from SC Johnson Wax, chlorinated polypropylenes and polyethylenes available from Allied Chemical and Petrolite Corporation and SC Johnson Wax, and the like. Mixtures of waxes may also be used.

The toners may also include any additional additives, such as charge enhancing agents, embrittling agents, flow agents such as colloidal silica, external surface additives such as silica and/or titania, and the like, as desired or necessary.

The emulsion aggregation toner has advantages in achieving a small sized toner particle with a substantially uniform particle size distribution. For example, the toner particles may have an average particle size of from about 3 to about 25 µm, such as from about 5 to about 15 µm or from about 5 to about 12 µm, as determined by use of a Coulter Counter or similar device. The volume average and number average geometric size distribution (GSDv and GSDn) of the toner particles of embodiments maybe in a range of from about 1.1 to about 1.3, as measured with a suitable process such as Coulter Counter Multisizer II. The volume average and the number average distribution, respectively, are determined based on the particle diameters at which a cumulative percentage of particles are attained. In this regard, the particle diameters at which a cumulative percentage of 16 percent are attained are defined as volume D16 percent and number D16 percent, respectively, and the particle diameters at which a cumulative percentage of 84 percent are attained are defined as volume D84 percent and number D84 percent, respectively. These aforementioned volume average particle size distribution index GSDv and number average particle size distribution index GSDn can be expressed by using D16 percent and D84 percent in cumulative distribution, wherein the volume average particle size distribution index GSDv is expressed as (volume D84 percent/volume D16 percent)½ and the number average particle size distribution index GSDn is expressed as (number D84 percent/number D16 percent)½.

The toner may be made by melt mixing the ingredients together in a mixing device. Examples of mixing devices are twin screw extruders, Banbury/rollmill, kneaders, and the like.

The toner particles may also be made by chemical processes such as by emulsion aggregation. Any suitable emulsion aggregation procedure may be used in forming the emulsion aggregation toner particles without restriction. These procedures typically include the basic process steps of at least aggregating an emulsion containing the binder components, one or more colorants, optionally one or more surfactants, optionally one or more waxes, optionally a coagulant and one or more additional optional additives to form aggregates, subsequently coalescing the aggregates, and then recovering, optionally washing and optionally drying the obtained emulsion aggregation toner particles.

An example emulsion aggregation procedure may comprise providing a latex or emulsion of the binder components, any wax, any colorant, and any other desired or required additives. In embodiments, the amorphous and crystalline polyesters may be formed in different emulsions and mixed together in a pre-toner mixture prior to aggregation. The pH of the pre-toner mixture may be adjusted to between about 4 to about 5. The pH of the pre-toner mixture may be adjusted by an acid such as, for example, acetic acid, nitric acid or the like. Additionally, in embodiments, the pre-toner mixture optionally maybe homogenized by mixing at about 600 to about 4,000 revolutions per minute. The particles may then be aggregated, for example through addition of an aggregating agent or coagulant to the emulsion. The aggregating agent is generally an aqueous solution of a divalent cation or a multivalent cation material. The aggregating agent may be, for example, polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. Aggregation may be accomplished at temperatures greater than about 60° C. Following aggregation to the desired particle size, the aggregates may be coalesced. Coalescence may be accomplished by heating the aggregate mixture to a temperature that is about 5 to about 20° C. above the Tg of the binder. Generally, the aggregated mixture is heated to a temperature of about 50 to about 80° C. In embodiments, coalescence is accomplished by also stirring the mixture at a temperature of from about 200 to about 750 revolutions per minute. Optionally, during coalescence, the particle size of the toner particles may be controlled and adjusted to a desired size by adjusting the pH of the mixture. Generally, to control the particle size, the pH of the mixture is adjusted to between about 5 to about 7 using a base such as, for example, sodium hydroxide. After coalescence, the mixture is cooled to room temperature. After cooling, the mixture of toner particles is washed with water and then dried. Drying may be accomplished by any suitable method for drying including freeze drying.

The process may or may not include the use of surfactants. If used, the surfactants may be anionic, cationic or nonionic. Anionic surfactants include sodium dodecylsulfate (SDS), sodium dodecyl benzene sulfonate, sodium dodecylnaphthalene sulfate, dialkyl benzenealkyl, sulfates and sulfonates, abitic acid, and the NEOGEN brand of anionic surfactants available from Daiichi Kogyo Seiyaku Co. Ltd. Examples of cationic surfactants include dialkyl benzene alkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C12, C15, C17 trimethyl ammonium bromides, halide salts of quaternized polyoxyethylalkylamines, dodecyl benzyl triethyl ammonium chloride, MIRAPOL and ALKAQUAT available from Alkaril Chemical Company, SANISOL (benzalkonium chloride), available from Kao Chemicals, and the like. Examples of nonionic surfactants include polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc Inc. as IGEPAL CA-210, IGEPAL CA-520, IGEPAL CA-720, IGEPAL CO-890, IGEPAL CO-720, IGEPAL CO-290, IGEPAL CA-210, ANTAROX 890 and ANTAROX 897.

Following formation of the toner particles, external additives may be added to the toner particle surface by any suitable procedure such as those well known in the art. For example, suitable surface additives that may be used are one or more of $SiO_2$, metal oxides such as, for example, $TiO_2$ and aluminum oxide, and a lubricating agent such as, for example, a metal salt of a fatty acid (for example, zinc stearate (ZnSt), calcium stearate) or long chain alcohols such as UNILIN 700. $SiO_2$ and $TiO_2$ may be surface treated with compounds including DTMS (dodecyltrimethoxysilane) or HMDS (hexamethyldisilazane). Examples of these additives are a silica coated with a mixture of HMDS and aminopropyltriethoxysilane; a silica coated with PDMS (polydimethylsiloxane); a silica coated with octamethylcyclotetrasiloxane; a silica coated with dimethyldichlorosilane; DTMS silica, obtained from Cabot Corporation, comprised of a fumed silica, for example silicon dioxide core L90 coated with DTMS; silica coated with an amino functionalized organopolysiloxane; X24 sol-gel silica available from Shin-Etsu Chemical Co., Ltd.; TS530 from Cabot Corporation, Cab-O-Sil Division, a treated fumed silica; titania comprised of a crystalline titanium dioxide core coated with DTMS. The titania may also be untreated, for example P-25 from Nippon Aerosil Co., Ltd. Zinc stearate may also be used as an external additive, the zinc stearate providing lubricating properties. Zinc stearate provides developer conductivity and tribo enhancement, both due to its lubricating nature. In addition, zinc stearate can enable higher toner charge and charge stability by increasing the number of contacts between toner and carrier particles. Calcium stearate and magnesium stearate provide similar functions. Most preferred is a commercially available zinc stearate known as ZINC STEARATE L, obtained from Ferro Corporation.

The toners are sufficient for use in an electrostatographic or xerographic process. In this regard, the toner particles may be formulated into a developer composition, optionally by mixing with carrier particles. The toner concentration in each developer may range from, for example, about 1 to about 25%, such as from about 2 to about 15%, by weight of the total weight of the developer. Illustrative examples of carrier particles that can be selected for mixing with the toner include those particles that are capable of triboelectrically obtaining a charge of opposite polarity to that of the toner particles. Illustrative examples of suitable carrier particles include granular zircon, granular silicon, glass, steel, nickel, ferrites, iron ferrites, silicon dioxide, and the like. Additionally, there can be selected as carrier particles nickel berry carriers, comprised of nodular carrier beads of nickel, characterized by surfaces of reoccurring recesses and protrusions thereby providing particles with a relatively large external area. The carrier particles may be used with or without a coating, the coating generally being comprised of fluoropolymers, such as polyvinylidene fluoride resins, terpolymers of styrene, methyl methacrylate, a silane, such as triethoxy silane, tetrafluoroethylenes, other known coatings and the like. The carrier core may be at least partially coated with a polymethyl methacrylate (PMMA) polymer. PMMA is an electropositive polymer that will generally impart a negative charge on the toner by contact. The coating has, in embodiments, a coating weight of from about 0.1 weight percent to about 5.0 weight percent, or from about 0.5 weight percent to about 2.0 weight percent of the carrier. The carrier particles may be prepared by mixing the carrier core with from about 0.05 weight percent to about 10 weight percent of polymer, such as from about 0.05 weight percent to about 3 weight percent of polymer, based on the weight of the coated carrier particles, until the polymer coating adheres to the carrier core by mechanical impaction and/or electrostatic attraction. Various effective suitable means can be used to apply the polymer to the surface of the carrier core particles, for example, cascade-roll mixing, tumbling, milling, shaking, electrostatic powder-cloud spraying, fluidized bed, electrostatic disc processing, and with an electrostatic curtain. The mixture of carrier core particles and polymer may then be heated to melt and fuse the polymer to the carrier core particles. The coated carrier particles are then cooled and classified to a desired particle size.

Carrier particles can be mixed with toner particles in any suitable combination in embodiments. In some embodiments, for example, about 1 to about 5 parts by weight of toner particles are mixed with from about 10 to about 300 parts by weight of the earner particles.

In embodiments, any known type of image development system may be used in an image developing device, including, for example, magnetic brush development, jumping single-component development, hybrid scavengeless development (HSD), etc. These development systems are well known in the art, and further explanation of the operation of these devices to form an image is thus not necessary herein. The toners are included in a housing of the device, and provided from the housing to an image development station of the device in forming an image. Once the image is formed with toners/developers via a suitable image development method such as any one of the aforementioned methods, the image is then transferred to an image receiving medium such as paper and the like. The device may include a fuser roll member. Fuser roll members are contact fusing devices that are well known in the art, in which heat and pressure from the roll are used in order to fuse the toner to the image-receiving medium. Typically, the fuser member may be heated to a temperature just above the fusing temperature of the toner.

The toners described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Comparative Example 1

Phase Inversion Emulsion Procedure 100 g of a high molecular weight crystalline polyester resin (High Mw polyester resin A) was weighed out in a 1 L kettle. The acid value for High Mw polyester resin A is 13.22 mg KOH/g resin. 100 g of methyl ethyl ketone (MEK) and 10 g of iso-propanol (IPA) were weighed out separately and mixed together in a beaker. The solvents were poured into a kettle. The kettle, with its cover on, a gasket, a condenser and two rubber stoppers, were placed inside a water bath set at 45° C. (maintained Tr at 42-43° C.).

The agitator (anchor blade impeller) was set up in the kettle to rotate at approximately 50 RPM. After 1.5 hours, when all of the resins have dissolved, the bath temperature was decreased to 42° C. (maintained Tr at 40° C.) the rotation was adjusted to approximately 100 RPM. After 15 minutes, 6.01 g of 10% $NH_4OH$ (calculated by the formula: neutralization rate×amount of resins in grams×acid number×0.303×10−2) was added to the mixture drop-wise with a disposable pipette through a rubber stopper during a period of 2 minutes. The mixture was left alone for 10 minutes. 300 g of de-ionized water (DIW) was then added into the kettle by a pump through a rubber stopper. The first 200 g were added in 90 minutes with the pump set to a rate of 4.44 g/min. A small sample (i.e., 3-4 drops) was taken with a pipette at 60 minutes. The emulsion sample was diluted with hot DIW (40° C.) in a vial for the particle size measurement. The last 100 g are added in 30 minutes with the pump set to a rate of 6.7 g/min. The apparatus was dismantled, and the mixture was poured into a glass pan, which was kept in the fume hood overnight and stirred by a magnetic stir-bar. A sample was taken before evaporation for a particle size (diluted with hot DIW and pH test.

The latex particle size was $D_{50}$=178.5 nm, $D_{90}$=244.7 nm at 35.2% solid loading.

Comparative Example 2

High Molecular Weight Polyester Resin with Ammonia Hydroxide as Neutralization Agent (Control PIE)

Eight branched high molecular weight polyester resin samples, R1, R2, R3, R4, R5, R6, R7, R8 (R8-1 and R8-2), and one reference sample, High Mw polyester resin A, were attempted to be emulsified using nominal PIE process as described in Comparative Example 1, except that instead of pumping DIW to resin solution with 50 RPM agitation, DIW was added drop wise to the resin solution manually with hand shaking.

The detailed process is described below. 20 grams of resin was charged in 125 mL plastic bottle and was dissolved with 20 grams MEK and 2 grams IPA mixture in 50° C. water bath with stirring. 3.24 grams of dissolved resin was transferred into a 10 mL vial followed by adding 10% $NH_4OH$ to the vial and hand shaken for 2 minutes for complete mixing. The amount of ammonium hydroxide was estimated based on the neutralization ratio according to the following equation: neutralization ratio in an equivalent amount of 10% NH3/resin (g)/resin acid value/0.303100. About 3-4 grams water was then added to the above mixture drop wise with shaking to obtain the emulsion. The emulsification process is considered to be unsuccessful (even after trying different neutralization ratios and different solvent ratios, such as, resin:MEK:IPA (20:20:1.5), or resin:MEK:IPA (20:40:4), (1) if the resulting emulsion does not have a particle size of 100-300 nm, or (2) had produced broad particle size distribution or even with bimodal or tri modal peak distribution The results of this PIE process in emulsifying the branched polyester resin samples are shown in Table 1. All eight resin samples that were dissolved in ratio of 10:10:1 or 10:10:1.5 (resin:MEK:IPA) failed to produce stable emulsions, except for the reference sample High Mw polyester resin A. Only one sample R8-2 achieved good stable latex within target particle size (with higher solvent ratio which is 10:20:1 of resin:MEK:IPA). The resulting emulsion of samples R3 and R4 contain particles that were too large and the neutralization operating ranges were very narrow.

TABLE 1

| Resin ID | Acid Value (mg KOH/g resin) | Soften Point (° C.) | Resin/MEK/IPA ratio | Best Particle Size (nm) | Neutralization Ratio (%) | Note |
|---|---|---|---|---|---|---|
| R1 | 9.3 | 122.5 | 10/10/1.5 | None | — | |
| R2 | 10.13 | 124.3 | 10/10/1.5 | None | — | |
| A3 | 8.52 | 125.5 | 10/10/1.5 | 434 | 65 | Narrow emulsify window |
| R4 | 11.7 | 124.1 | 10/10/1.5 | 477 | 60.2 | Narrow emulsify window |
| R5 | 12.99 | — | 10/10/1 | None | — | |
| R6 | 13.6 | 120.4 | 10/10/1 | None | — | |
| R7 | 8.4 | 120.0 | 10/10/1 | None | — | |
| R8-1 | 8.1 | 120.2 | 10/10/1 | None | — | |
| R8-2 | 8.1 | 120.2 | 10/20/2 | 153-188 | 20-25 | |
| High Mw polyester resin A | 12.2 | 118.1 | 10/10/1 | 134-200 | 30-55 | |

Example 3

High Molecular Weight Polyester Resins with Organic Amine as Neutralization Agent (Modified PIE)

Eight branched polyester resin samples, R1, R2, R3, R4, R5, R6, R7, R8 (R8-1 and R8-2), and the two reference resin samples were emulsified using the following modified PIE: 20 grams resin was charged in 125 ml plastic bottle and dissolved with 20 grams MEK and 2 grams IPA mixture in 50° C. water bath with stirring. 3.24 grams dissolved resin transferred to a 10 mL vial followed by adding 10% triethylamine to the vial and hand shaken for 2 minutes for complete mixing. The amount of triethylamine was estimated based on the neutralization ratio. About 3-4 grams water was then added to the above mixture drop wise with shaking to obtain the emulsion.

All resins, including the two reference samples were emulsified successfully in 10:10:1 ratio (resin:MEK:IPA) and the emulsions obtained had particle size of 150-200 nm and the neutralization ratio latitude was wide which mean the process is easier to scale up. The results of successfully produced latexes with modified PIE are shown in Table 2.

TABLE 2

| Resin ID | Acid Value (mg KOH/g resin) | Soften Point (° C.) | Resin/MEK/IPA ratio | Best Particle Size (nm) | Neutralization Ratio (%) |
|---|---|---|---|---|---|
| R1 | 9.3 | 122.5 | 10/10/1.5 | 159.8 | 122 |
| R2 | 10.13 | 124.3 | 10/10/1.5 | 201 | 116 |
| R3 | 8.52 | 125.5 | 10/10/1.5 | 186 | 105 |
| R4 | 11.7 | 124.1 | 10/10/1.5 | 256 | 97 |
| R5 | 12.99 | — | 10/10/1 | 142-147 | 94-102 |
| R7 | 8.4 | 120.0 | 10/10/1 | 155-190 | 110-145 |
| R8-1 | 8.1 | 120.2 | 10/10/1 | 164 | 100 |
| R8-2 | 8.1 | 120.2 | 10/20/2 | 161-200 | 201-289 |
| High Mw polyester resin A | 12.2 | 118.1 | 10/10/1 | 134-200 | 111 |
| Low Mw polyester resin B | 11.3 | 116.4 | 10/10/1 | 113-179 | 69.7 |

Example 4

High Molecular Weight Polyester Resins with Triethylamine (Larger Scale PIE Latex Used to Make Toner)

Two high molecular weight polyester resins and two reference resins were chosen to make bench scale latex with triethylamine as neutralization agent.

100 grams resin was charged in 500 ml plastic bottle and was dissolved with 100 grams MEK and 10 grams IPA mixture (i.e., resin:MEK:IPA ratio=10:10:1) in 45° C. water bath with stirring. Triethylamine was added to plastic bottle and hand shaking 2 minutes for complete mixing. The amount of triethylamine was estimated based on the neutralization ratio according to the following equation: neutralization ratio in an equivalent amount of 10% triethylamine (g)/resin(g)/resin acid value/constant (e.g., 1.804)*100. About 125 grams water was then added to the above mixture drop wise with shaking to obtain the emulsion.

All resins emulsified successfully and the neutralization ratio was the same as mini PIE experiments and the resulting emulsions obtained had similar particle size as mini PIE experiments. This indicates that the organic amine neutralization agent had very good repeatability. The data of successfully bench scale produced latexes with modified PIE is shown in Table 3.

TABLE 3

| Resin ID | Acid Value (mg KOH/g resin) | Soften Point (° C.) | Resin/MEK/IPA ratio | Best Particle Size (nm) | Neutralization Ratio (%) | Scale (used resin) (g) |
|---|---|---|---|---|---|---|
| R7 | 8.4 | 110 | 10/10/1 | 164.9 | 132 | 50 |
| R7 | 8.1 | 117 | 10/10/1 | 144 | 99 | 100 |
| High Mw polyester resin A | 12.2 | 102 | 10/10/1 | 167 | 111 | 200 |
| Low Mw polyester resin B | 11.3 | 116.4 | 10/10/1 | 176 | 69.7 | 76 |

Toner particles were prepared from polyester resins Low Mw polyester B and High Mw polyester A emulsified by this modified PIE process that uses an organic amine such as triethylamine instead of ammonium hydroxide. The resulting latexes were used to make an emulsion aggregation toner.

Preparation of Emulsion Aggregation Toner:

Into a 2 liter glass reactor equipped with an overhead mixer was added 156.35 g low molecular weight amorphous resin1 emulsion (21.35 wt %), 108.06 g high molecular weight amorphous resin 2 emulsion (30.89 wt %), 29.03 g crystalline resin emulsion (33.51 wt %), 42.57 g IGI wax dispersion (30.34 wt %) and 49.37 g black pigment Nipex 35 (17.00 wt %). Separately 2.51 g Al2(SO4)3 (27.85 wt %) was added in as flocculent under homogenization. The mixture was heated to 40.0° C. to aggregate the particles while stirring at rpm 200 rpm. The particle size was monitored with a Coulter Counter until the core particles reached a volume average particle size of 4.63 μm with a GSD volume of 1.26, GSD number of 1.31, and then a mixture of 91.8 g and 63.45 g of above mentioned resin 1 and resin 2 emulsions were added as shell material, resulting in a core-shell structured particles with an average particle size of 5.71 microns, GSD volume 1.20, GSD number 1.23. Thereafter, the pH of the reaction slurry was then increased to 7.8 using 4 wt % NaOH solution to freeze the toner growth. After freezing, the reaction mixture was heated to 85° C. while maintaining pH greater than 7.8. Toner particles have average particle size of 6.61 microns, GSD volume 1.26, GSD number 1.33. After being kept at 85° C. for about 30 min, pH was reduced to 7.0 stepwise over 44 min using pH 5.7 acetic acid/sodium acetate (HAc/NaAc) buffer solution for coalescence. The toner was quenched after coalescence, resulting in a final particle size of 6.21 microns, GSD volume of 1.26, GSD number of 1.33. The toner slurry was then cooled to room temperature, separated by sieving (25 μm), filtration, followed by washing and freeze dried.

The resulting toner particle properties as compared those prepared by the conventional process are included in Table 4. The particle size and GSDv/n values are within the desired specification range. The particle shape as measured by circularity was also within specifications.

TABLE 4

|  | Conventional Process | Inventive Process |
|---|---|---|
| Raw Materials (resin) Information | Resin 1: Low molecular weight polyester amorphous Resin<br>Resin 2: high molecular weight polyester amorphous Resin | Low molecular weight/high weight polyester amorphous Resin Emulsified withTriethylamine |
| Latexes | Emulsified resin 1 and resin 2 with normal PIE process | Emulsified resin 1 and resin 2 with triethylamine as neutralization agent |
| Particle Size | $D_{50}$/GSDv/GSDn = 5.71/1.20/1.23 | $D_{50}$/GSDv/GSDn = 6.21/1.26/1.33 |
| Circularity | 0.952 | 0.952 |
| Note | Control | |

Two toner samples were blended with additives and tested using Xerox methods for charging evaluation. The modified PIE sample is compared against the control sample above.

Figure 2:
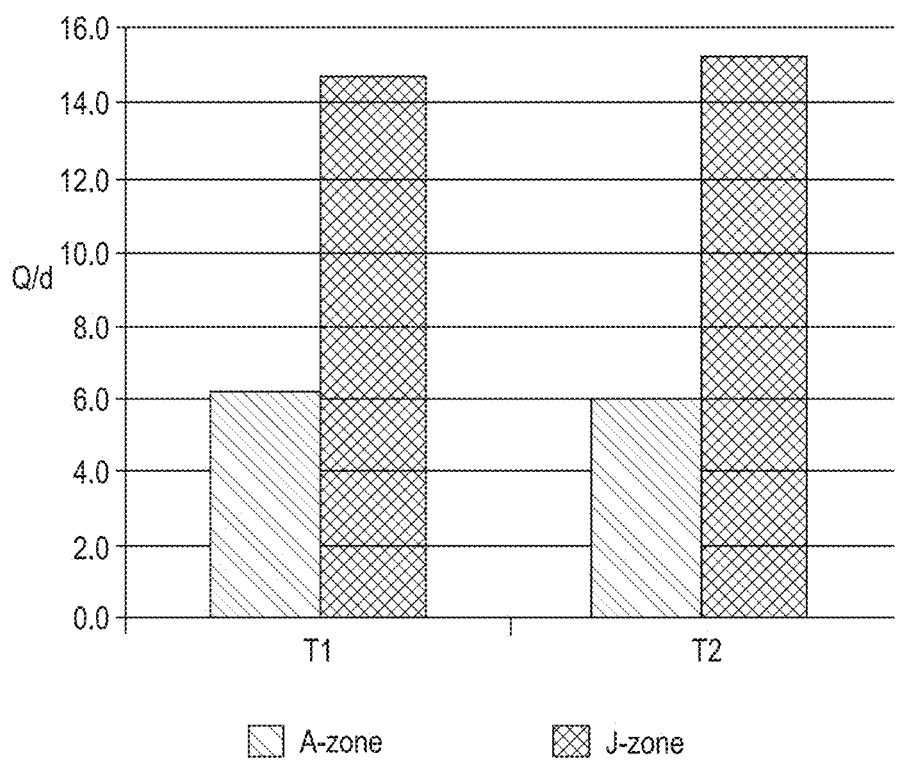
FIG. 2 is a graph illustrating a comparison of toner performance in A zone, which is an environment of 85% RH at 28° C., and J zone, which is an environment of 10% RH and 21° C., of toners with additives produced by the present embodiments as compared to those produced by a control.

As can be seen in FIGS. 1 and 2, the parent charging for the modified PIE sample looks slightly higher in A-zone and lower in J-zone than the control sample (FIG. 1). With additives, the modified sample has identical charging to the control sample (FIG. 2).

The unit Q/d was measured using a charge spectrograph with a 100 V/cm field, and was measured visually as the midpoint of the toner charge distribution. The charge was reported in millimeters of displacement from the zero line (mm displacement can be converted to femtocoulombs/micron (fC/μm) by multiplying by 0.092).

The two toner samples were also submitted for fusing evaluation. The results demonstrate that (1) cold offset temperature (i.e., Lower limit fuser roll temperature where toner fails to adhere to the substrate and significant quantities offset to the fuser roll), (2) crease fix MFT (i.e., minimum fusing temperature required to achieve acceptable toner adhesion to the substrate), and (3) temperature required to reach gloss 40 (i.e., fuser roll temperature required so the print gloss is 40 gloss units) were the same for the two samples.

Example 5

High Molecular Weight Polyester Resins

All the polyester resin samples have a molecular weight (Mn) in the range between 86,000 and 121,000 and a Tg onset between 56° C. and 65° C.

The polyester resin samples were produced in two stages. In the first stage ethoxylated BPA (E-BPA), propoxylated BPA (P-BPA), terephthalic aicd (TA), and dodecenylsuccinic anhydride (DDSA) were condensed with catalyst (Fastcat 4100) at 220° C. under $N_2$ flow over 6 hours. In the second stage, a branching agent trimellitic anhydride (TMA) was added and the reaction proceeded at 220° C. under $N_2$ flow over 19 hours. The end point for the polymerization was monitored by acid value titrations and viscosity. The target viscosity and acid value are 98±5 poise and 12.4±1 mg KOH/g resin, respectively. Once the desired properties were achieved, the reactor was discharged. The characterization of all polyester resins are shown in Table 5.

TABLE 5

|  | Mw (xK) | Mn (xK) | PD | Tg (° C.) | Av (mg KOH/g resin) | Ts (° C.) |
|---|---|---|---|---|---|---|
| High Mw polyester resin A(1001) reference | 84.08 | 5.22 | 16.11 | 56.4 | 12.2 | 118.1 |
| R1 | 41.17 | 5.18 | 7.95 | 59.93 | 9.3 | 122.5 |
| R2 | 52.55 | 4.6 | 11.43 | 58.2 | 10.13 | 124.9 |
| R3 | 56.9 | 5.1 | 11.15 | 60.01 | 8.5 | 125.5 |
| R4 | 59.75 | 5.69 | 10.51 | 60.23 | 11.7 | 124.1 |
| R5 | 31.64 | 3.1 | 10.14 | 59.79 | 12.99 | \ |
| R6 | 34.91 | 5.09 | 5.86 | 61.72 | 13.6 | 120.4 |
| R7 | 41.62 | 5.5 | 7.56 | 57.67 | 8.4 | 120 |
| R8 | 44.12 | 5.88 | 7.51 | 56.78 | 8.1 | |

Example 6

Preparation of Toners

A toner particle T1 was prepared from high Mw polyester resin A and low Mw polyester resin B emulsified by the modified PIE process of the disclosure that uses an organic amine such as triethylamine instead of ammonium hydroxide. The resulting latexes were used to prepare an emulsion aggregation toner according to the procedure described above. The resulting toner particle properties are included in Table 6. The particle size and GSDv/n values are within the spec range. The particle shape as measured by circularity was also within specification.

TABLE 6

|  | T2 (Control) | T1 |
|---|---|---|
| Raw Material Information | Low Mw polyester resin B/ High Mw polyester resin A | Low Mw polyester resin B/A56 |
| Latex | Low Mw polyester resin B ammonium hydroxide latex<br>High Mw polyester resin A ammonium hydroxide latex | Low Mw polyester resin B triethylamine latex<br>High Mw polyester resin A triethylamine latex<br>Latex Size:<br>167.4 nm/144.3 nm |
| Particle Size (nm) | 5.71/1.20/1.23 | 5.71/1.23/1.40 |
| Circularity | 0.952 | 0.966 |
| Note | Control | |

The toner sample T1 and the control toner sample Y03 have been examined using a Hitachi SU8000 scanning electron microscope.

Figure 3:
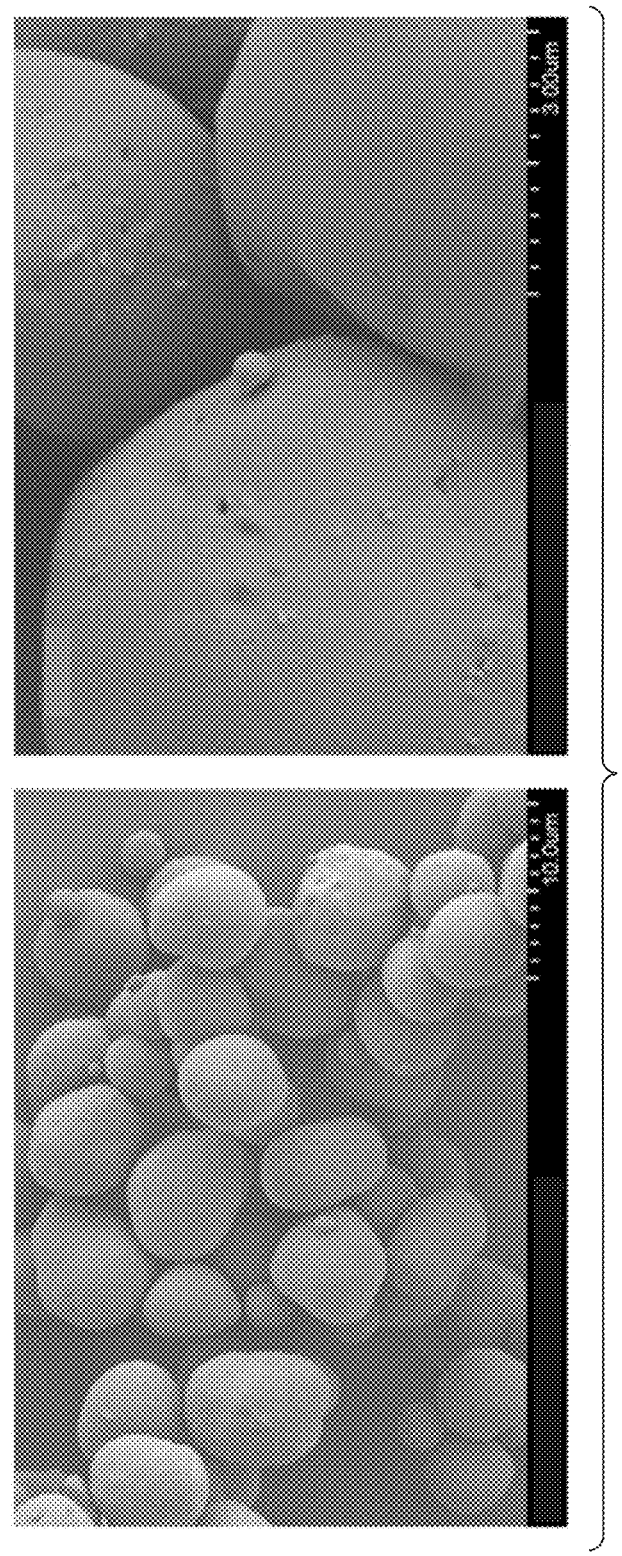
FIG. 3 shows SEM micrographs illustrating the morphology texture and surface texture of the toner particles according to the present embodiments.
Figure 4:
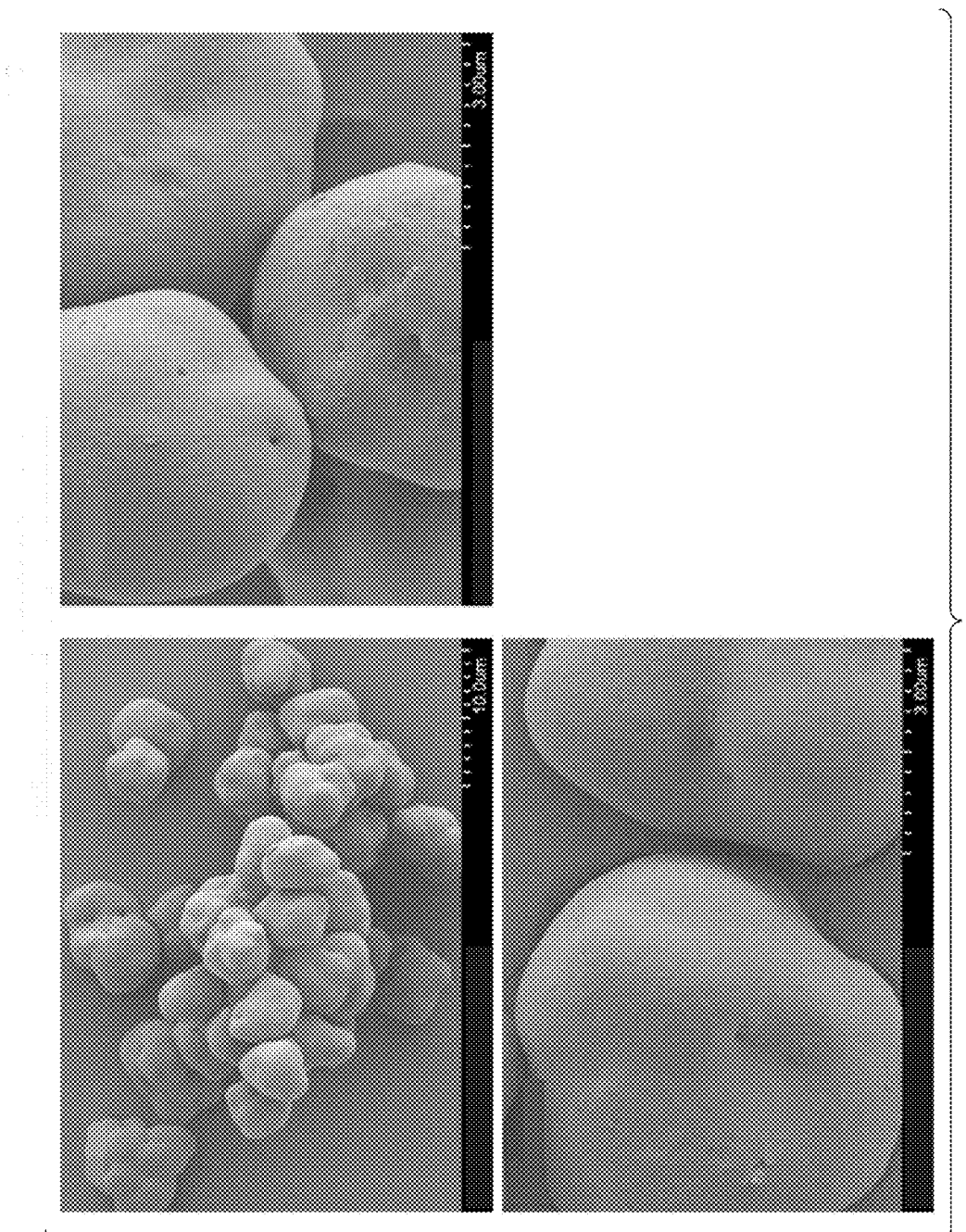
FIG. 4 shows SEM micrographs illustrating the morphology texture and surface texture of the control toner particles.

The toner particles within the sample of T1 were similar in surface nature to the control toner sample T2, and were also more spherical in shape, i.e., having higher circularity than control toners. All SEM micrographs are shown in the FIG. 3 and FIG. 4.

The toners sample T1 and the control toner sample Y03 were submitted for fusing evaluation. Fusing performance (gloss, crease, and hot offset measurements) of particles was collected and results are shown below.

T2 (prepared according to control PIE): minimum fixing temperature (MFT)=113, Gloss Mottle=190 (severe mottle), Hot offset=200° C.

Y09 (prepared according to modified PIE): MFT=111, Gloss Mottle ~190, Hot offset=205° C.

The print glosses for the control and modified PIE toners were nearly identical up to 165° C. There were some differences at the higher temperatures with T2 showing severe gloss mottle at 190° C. while Y09 shows a more gradual drop in gloss as temperature increases.

Figure 5:
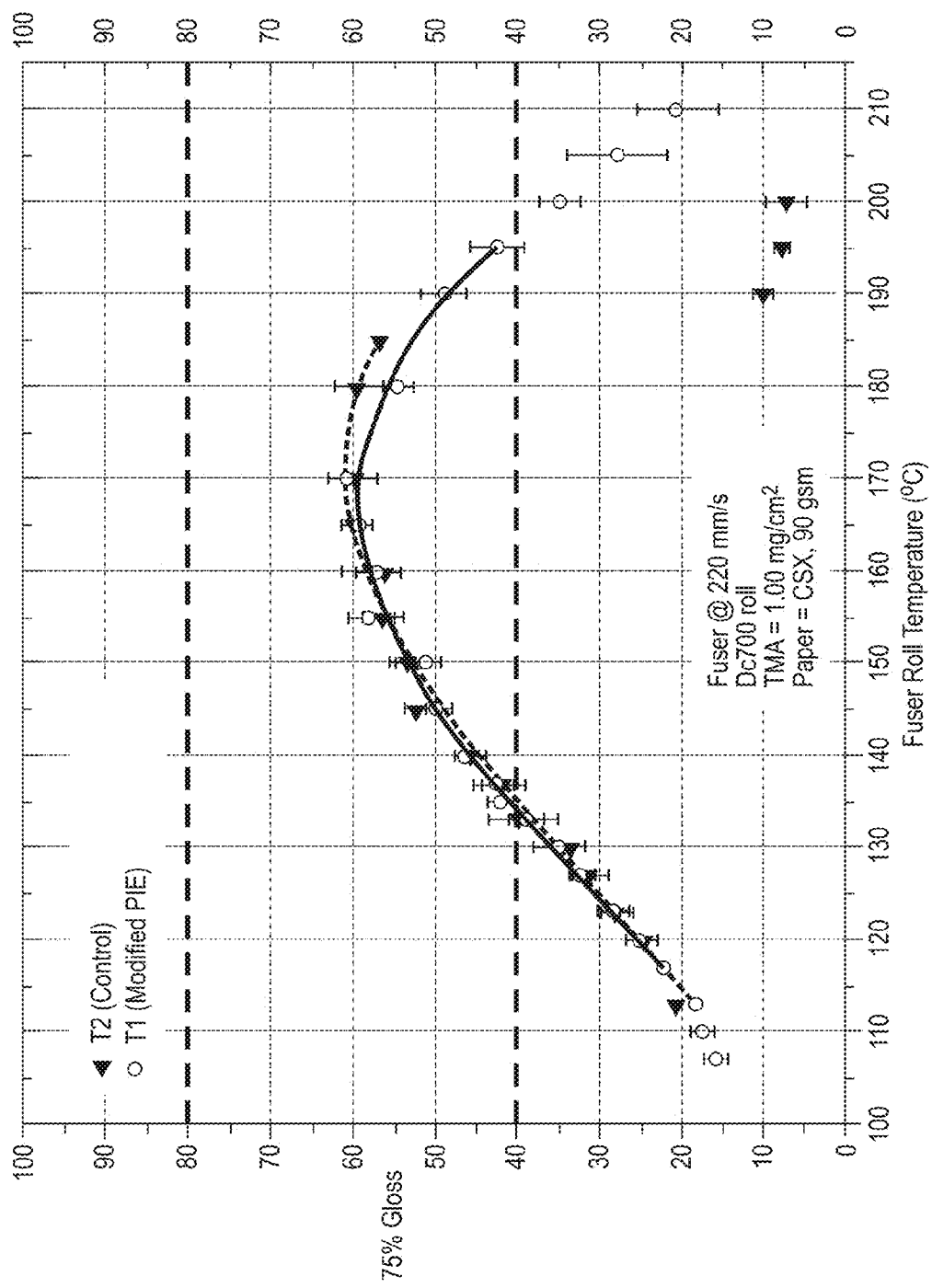
FIG. 5 shows a graph illustration the gloss versus fusing temperature of a control ink and inks prepared according to the present embodiments.

FIG. 5 shows a graph illustrating the gloss versus fusing temperature for T1 and T2

The toner made using resins from the modified PIE process have similar or better fusing performance (e.g., fusing latitude) when compared to the control PIE process toner.

SUMMARY

In summary, there is provided a modified PIE process using organic amines to successfully emulsify high molecular weight amorphous resin and emulsify high molecular branched amorphous polyester resin to achieve the desired particle size of 100-250 nm. The experiments conducted demonstrated that large scale latex could be prepared using this process and toner particles with the desired particle properties were subsequently produced from these latexes.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. An aqueous emulsion made by a process comprising:
   mixing at least one polyester resin comprising a high molecular weight polyester having a number average molecular weight of from about 86,000 and 121,000 with a solvent to form a resin mixture;
   neutralizing the resin mixture with a neutralizing agent in water; and
   agitating the resin mixture and neutralizing agent in water to form an aqueous emulsion, wherein the neutralizing agent is selected from the group consisting of triethylamine, triethaneolamine, and mixtures thereof, and further wherein the solvent comprises two organic solvents and a ratio of the two organic solvents is from about 5:1 to about 50:1.

2. The aqueous emulsion of claim 1, wherein the polyester amorphous resin comprises propoxylated-bisphenol-A, ethoxylated-bisphenol-A, and mixtures thereof.

3. The aqueous emulsion of claim 1, wherein the polyester resin has a low acid value of from about 3 mg KOH/g of resin to about 200 mg KOH/g of resin.

4. The aqueous emulsion of claim 1, wherein the solvent is selected from the group consisting of alcohols, esters, ethers, ketones, amines, and mixtures thereof.

5. The aqueous emulsion of claim 1, wherein the aqueous emulsion has a particle size in a range produce emulsions with particle size in the desired range of from about 100 to about 250 nm.

6. The aqueous emulsion of claim 1, wherein the aqueous emulsion has a narrow particle size distribution.

7. The aqueous emulsion of claim 1, wherein the resin mixture comprises a weight ratio of the resin to solvent of about 2:1 to about 1:5.

8. The aqueous emulsion of claim 1, wherein the neutralization agent is present in the aqueous emulsion in an amount of from about 0.001% to about 50% percent by weight of the total weight of the resin.

9. The aqueous emulsion of claim 1 being an emulsion aggregate toner.

10. The aqueous emulsion of claim 1, wherein the solvent is selected from the group consisting of methanol, ethanol, propanol, isopropanol (IPA), butanol, ethyl acetate, methyl ethyl ketone.

11. The aqueous emulsion of claim 1, wherein the solvent mixture comprises ketone and alcohol.

12. The aqueous emulsion of claim 1, wherein the resin and neutralizing agent has a neutralization ratio of from about 50% to about 300%.

* * * * *